United States Patent Office 3,737,434
Patented June 5, 1973

3,737,434
CERTAIN 2-ACYL-2,4-DIHYDRO-6-PHENYL[1,2,3,5] THIATRIAZOLO[5,4-a][1,4]BENZODIAZEPINE - 1-OXIDES AND PROCESS
Jackson B. Hester, Jr., Galesburg, Mich., assignor to The Upjohn Company, Kalamazoo, Mich.
No Drawing. Filed Dec. 3, 1971, Ser. No. 204,679
Int. Cl. C07d 99/10
U.S. Cl. 260—302 F        6 Claims

ABSTRACT OF THE DISCLOSURE

A 2-acyl-2,4-dihydro - 6 - phenyl[1,2,3,5]thiatriazolo-[5,4-a][1,4]benzodiazepine-1-oxide of the Formula II

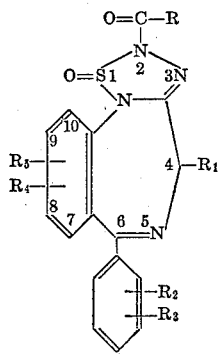

I wherein R is hydrogen or alkyl of 1 to 2 carbon atoms, inclusive; wherein $R_1$ is hydrogen or alkyl of 1 to 3 carbon atoms, inclusive; and wherein $R_2$, $R_3$, $R_4$, and $R_5$ are selected from the group consisting of hydrogen, alkyl of 1 to 3 carbon atoms, inclusive, fluoro, chloro, bromo, iodo, nitro, cyano, trifluoromethyl, and alkoxy, alkylthio, alkylsulfonyl, alkylsulfinyl, amino, alkanoylamino in which the carbon moiety is of 1 to 3 carbon atoms and dialkylamino in which alkyl is of 1 to 3 carbon atoms, inclusive, are prepared by reacting a benzodiazepin-2-yl hydrazide of the Formula I

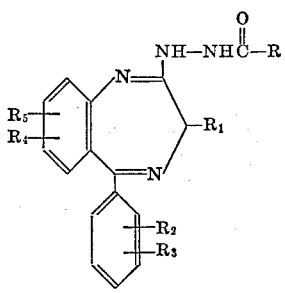

I wherein R, $R_1$, $R_2$, $R_3$, $R_4$, and $R_5$ are defined as above with thionyl chloride.

The compounds of Formula II and the pharmacologically acceptable acid addition salts thereof are useful sedatives and tranquilizers for mammals and birds.

BACKGROUND OF THE INVENTION

Field of the invention

This invention is directed to new organic compounds and is particularly concerned with novel 2-acyl-2,4-dihydro - 6 - phenyl[1,2,3,5]thiatriazolo[5,4-a][1,4]benzodiazepine 1-oxides (II) and a process for the production thereof.

The novel compounds and the process of production therefor can be illustratively represented as follows:

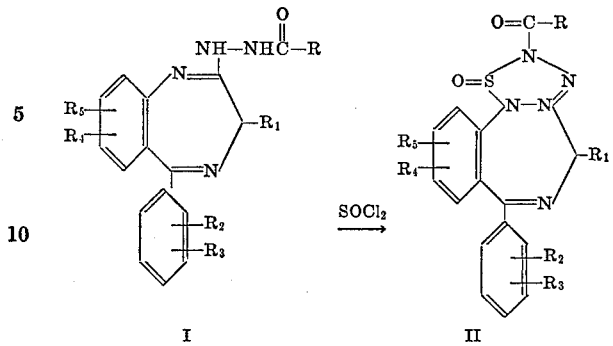

I          II wherein R is hydrogen or alkyl of 1 to 2 carbon atoms, inclusive; wherein $R_1$ is hydrogen or alkyl of 1 to 3 carbon atoms, inclusive; and wherein $R_2$, $R_3$, $R_4$, and $R_5$ are selected from the group consisting of hydrogen, alkyl of 1 to 3 carbon atoms, inclusive, fluoro, chloro, bromo, iodo, nitro, cyano, trifluoromethyl, amino, and alkoxy, alkylthio, alkylsulfonyl, alkylsulfinyl, alkanoylamino in which the carbon moiety is of 1 to 3 carbon atoms and dialkylamino in which alkyl is of 1 to 3 carbon atoms, inclusive.

The process of this invention comprises: treating at temperatures between —20 to 10° C. a benzodiazepin-2-yl hydrazide of Formula I in solution with thionyl chloride to obtain the corresponding compound of Formula II.

Treating compounds of Formula II with an acid produces, the corresponding acid addition salts of II, which are also an object of this invention.

DESCRIPTION OF THE PREFERRED EMBODIMENT

Alkyl groups of 1 to 3 carbon atoms, inclusive, are exemplified by methyl, ethyl, propyl, and isopropyl.

The carbon chain moiety of alkoxy, alkylthio, alkylsulfinyl, alkylsulfonyl, alkanoylamino, dialkylamino which is of 1 to 3 carbon atoms, inclusive, in defined as alkyl of 1 to 3 carbon atoms, inclusive, as above.

Examples of alkoxy are methoxy, ethoxy, propoxy and isopropoxy; examples of alkylthio are methylthio, ethylthio, propylthio, isopropylthio; examples of alkylsulfinyl are methylsulfinyl, ethylsulfinyl, propylsulfinyl, and isopropylsulfinyl; examples of alkylsulfonyl are methylsulfonyl, ethylsulfonyl, propylsulfonyl, and isopropylsulfonyl; examples of alkanoylamino are acetylamino and propionylamino; examples of dialkylamino are dimethylamino, diethylamino, dipropylamino, and diisopropylamino.

The novel compounds of the Formulae II including acid addition salts thereof have sedative, tranquilizing, muscle-relaxant and anti-aggressive behavior effects in mammals and birds and can be also used as feed additives in farm animals.

The acid addition salts of compounds of Formulae II contemplated in this invention are hydrochlorides, hydrobromides, hydriodides, sulfates, phosphates, acetates, lactates, tartrates, citrates, salicylates, succinates, maleates, pamoates, cyclohexanesulfamates, benzenesulfonates, toluenesulfonates, methanesulfonates and the like, prepared by reacting a compound of Formula II with the stoichiometrically calculated amount of the selected pharmacologically acceptable acid.

The sedative effects of 2-acetyl-8-chloro-2,4-dihydro-6-phenyl]1,2,3,5]thiatriazole[5,4 - a][1,4]benzodiazepine 1-oxide are shown by the following tests in mice:

Chimney test: [Med. Exp. 4, 145 (1961)]: The effective (intraperitoneal) dosage for 50% of mice, $ED_{50}$ is 2.5 mg./kg. The test determines the ability of mice to back up and out of a vertical glass cylinder within 30 seconds. At the effective dosage, 50% of the mice failed doing it.

Dish test: Mice in Petri dishes (10 cm. diameter, 5 cm. high, partially embedded in wood shavings), climb out in a very short time, when not treated. Mice remaining in the dish for more than 3 minutes indicates tranquilization. $ED_{50}$ equals the dose of test compound at which 50% of the mice remain in the dish. $ED_{50}$ (intraperitoneal administration) in this test is 1.2 mg./kg.

Pedestal test: The untreated mouse leaves the pedestal in less than a minute to climb back to the floor of the standard mouse box. Transquilized mice will stay more than 1 minute. $ED_{50}$ (intraperitoneal administration) in this test is 5 mg./kg.

Nicotine antagonism test: Mice in a group of 6 are injected with the test compound 2-acetyl-8-chloro-2,4-dihydro - 6-phenyl[1,2,3,5]thiatriazolo[5,4-a]-[1,4]benzodiazepine-1-oxide. Thirty minutes later the mice, including control (untreated) mice, are injected with 2 mg./kg. nicotine salicylate. The control mice show over stimulation, i.e., (1) running convulsions followed by (2) tonic extensor fits; followed by (3) death. An intraperitoneal dosage of 5 mg./kg. of the test compound protected 50% of the mice against (2) and (3).

The pharmaceutical forms contemplated by this invention include pharmaceutical compositions suited for oral, parenteral and rectal use, e.g., tablets, pills, powder packets, cachets, dragées, capsules, solutions, suspensions, sterile injectable forms, suppositories, bougies, and the like. Suitable diluents or carries such as carbohydrates (lactose), lipids, calcium phosphate, cornstarch, stearic acid, methylcellulose and the like may be used as carriers or for coating purposes. Oil, e.g., coconut oil, sesame oil, safflower oil, cottonseed oil, peanut oil, or water may be used for preparing solutions or suspensions of the active drug. Sweetening, coloring, and flavoring agents may be added.

For mammals and birds, food premixes with starch, oatmeal, dried fishmeat, fishmeal, flour and the like can be prepared.

As transquilizer the compounds of Formula II can be used in dosage of 0.5–10 mg./kg. in oral or injectable preparations as described above, to alleviate tension and anxiety in mammals, or birds, such as e.g., occurs when animals (dogs, cats, horses, cattle, zoo animals) are in travel.

For weight gain, increase in food efficiency, increase in milk or egg production from 0.1–100 g. of a compound of Formula II is added per ton of feed.

Other acid addition salts of the compounds of Formulae II can be made such as the fluosilicic acid addition salts which are useful mothproofing compounds or the trichloroacetates useful as herbicides against Johnson grass, Bermuda grass, yellow foxtail, green foxtail and quack grass.

The starting materials of Formula I of this invention, substituted or unsubstituted 5 - phenyl - 3H-1,4-benzodiazepin-2-yl hydrazides are prepared as shown in the preparations from the reaction of unacylated 5-phenyl-3H-1,4-benzodiazepin-2-yl hydrazides with acetic or propionic anhydrides or from the reaction of 1,3-dihydro-5-phenyl-2H-1,4 - benzodiazepine-2-thiones with carboxylic acid hydrazides.

In carrying out the process of this invention the starting Compound I a selected 2-(2-acylhydrazino)-5-phenyl-3H-1,4-benzodiazepine, in an organic solvent e.g. methylene chloride, chloroform, dioxane, tetrahydrofuran, ether, and the like, is reacted with thionyl chloride in the presence of an organic base e.g. pyridine, triethylamine or the like. In the preferred embodiment of this invention, the addition of thionyl chloride is carried out at low temperatures between −25 to +10° C., but to complete the reaction, the reaction mixture is heated to room temperature, 20 to 30° C., for several hours (1 to 24 hours). Higher temperatures are operable, such as up to 40° C. After the reaction is completed the product is isolated and purified by conventional means, such as removal of solvents and excess thionyl chloride by distillation, extraction, crystallization, chromatography, and combinations thereof and the like.

The following examples are illustrative of the processes and products of the present invention, but are not to be construed as limiting.

PREPARATION 1

2 - (2-acetylhydrazino)-7-chloro-5-phenyl-3H-1,4-benzodiazepine [acetic acid, 2 - (7-chloro-5-phenyl-3H-1,4-benzodiazepin-2-yl)hydrazide]

A solution of acetic anhydride (1.12 g., 0.011 mole) in tetrahydrofuran (5 ml.) was added to an ice-cold solution of 2-hydrazino-7-chloro-5-phenyl-3H-1,4-benzodiazepine (2.85 g., 0.01 mole) in tetrahydrofuran (150 ml.), and the mixture was stirred at ambient temperature, under nitrogen for 2 hours 20 minutes. It was then poured into water and extracted with methylene chloride. The extract was dried over anhydrous potassium carbonate and concentrated. The residue was crystallized from methanol to give 2.29 g. of 2-(2-acetylhydrazino)-7-chloro-5-phenyl-3H-1,4-benzodiazepine of melting point 209–210° C. (dec.) and 0.39 g. of melting point 207–208° C. dec.).

PREPARATION 2

2-(2-propionylhydrazino)-7-chloro-5-(2,6-difluorophenyl)-3H-1,4-benzodiazepine

A mixture of 2.3 g. of 7-chloro-1,3-dihydro-5-(2,6-difluorophenyl)-2H-1,4-benzodiazepine-2-thione, 1.60 g. of propionic acid hydrazide and 80 ml. of absolute ethanol was refluxed for 24 hours with a slow stream of nitrogen bubbling through the mixture. The mixture was then concentrated to give a residue. A suspension of this residue in methylene chloride was filtered. Concentration of the filtrate and crystallization of the residue from ethyl acetate gave 2 - (2-propionylhydrazino)-7-chloro-5-(2,6-difluorophenyl)-3H-1,4-benzodiazepine.

In the manner given in the preceding preparations other compounds of Formula I can be prepared. Representative compounds of Formula I thus prepared include:

2-(2-propionylhydrazino)-7-chloro-5-phenyl-3H-1,4-benzodiazepine;

2-(2-acetylhydrazino)-7-nitro-5-(o-chlorophenyl)-3H-1,4-benzodiazepine;

2-(2-acetylhydrazino)-7-chloro-5-(o-chlorophenyl)-3H-1,4-benzodiazepine;

2-(2-acetylhydrazino)-8-methylthio-5-(p-bromophenyl)-3H-1,4-benzodiazepine;

2-(2-acetylhydrazino)-9-trifluoromethyl-5-(m-nitrophenyl)-3H-1,4-benzodiazepine;

2-(2-acetylhydrazino)-6,8-difluoro-5-(m-propylsulfinylphenyl)-3H-1,4-benzodiazepine;

2-(2-acetylhydrazino)-7,9-dicyano-5-phenyl-3H-1,4-benzodiazepine;

2-(2-acetylhydrazino)-8-ethylsulfonyl-5-(o-fluorophenyl)-3H-1,4-benzodiazepine;

2-(2-acetylhydrazino)-7-dimethylamino-5-(m-iodophenyl)-3H-1,4-benzodiazepine;

2-(2-acetylhydrazino)-5-(o-chlorophenyl)-3H-1,4-benzodiazepine;

2-(2-propionylhydrazino)-9-isopropyl-5-(p-propionamidophenyl)-3H-1,4-benzodiazepine;

2-(2-propionylhydrazino)-3,7,8-triethyl-5-(o-cyanophenyl)-3H-1,4-benzodiazepine;

2-(2-propionylhydrazino)-7-iodo-5-(p-methylsulfonylphenyl)-3H-1,4-benzodiazepine;

2-(2-propionylhydrazino)-9-formamido-5-(o-fluorophenyl)-3H-1,4-benzodiazepine;

2-(2-propionylhydrazino)-8-acetamido-5-phenyl-3H-1,4-benzodiazepine;

2-(2-propionylhydrazino)-6-bromo-5-(o-ethylthiophenyl)-3H-1,4-benzodiazepine;

2-(2-propionylhydrazino)-3-methyl-7-chloro-5-phenyl-
3H-1,4,-benzodiazepine;
2-(2-propionylhydrazino)-3-propyl-8-nitro-5-(p-
ethylphenyl)-3H-1,4,-benzodiazepine;
2-(2-propionylhydrazino)-3-isopropyl-7,8-dicyano-
5-phenyl-3H-1,4,-benzodiazepine;
and the like.

EXAMPLE 1

*2-acetyl-8-chloro-2,4-dihydro-6-phenyl[1,2,3,5]-thiatriazolo[5,4-a][1,4]benzodiazepine-1-oxide*

Pyridine (0.348 g., 0.0044 mole) and thionyl chloride (0.262 g., 0.0022 mole) were added successively to an ice-cold, stirred suspension of 2-(2-acetylhydrazino)-7-chloro-5-phenyl-3H-1,4-benzodiazepine (0.654 g., 0.002 mole) in dry, hydrocarbon-stabilized, chloroform (20 ml.). This mixture was stirred, under nitrogen in the ice bath for 1 hour and at ambient temperature for 18 hours. It was then poured into water and extracted with methylene chloride. The extract was dried over anhydrous potassium carbonate and concentrated. The residue was chromatographed on silica gel (50 g.) with 20% ethylacetate–80% Skellysolve B hexanes. The product thus obtained was crystallized from ethyl acetate Skellysolve B hexanes to give 0.41 g. of 2-acetyl-8-chloro-2,4-dihydro-6-phenyl [1,2,3,5]thiatriazolo[5,4 - a][1,4]benzodiazepine-1-oxide of melting point 159–160° C. The analytical sample had a melting point of 160.5–161.5° C.

*Analysis.*—Calcd. for $C_{17}H_{13}ClN_4O_2S$ (percent): C, 54.76; H, 3.51; Cl, 9.51; N, 15.03; S, 8.60. Found (percent): C, 54.56; H, 3.51; Cl, 9.50; N, 15.07; S, 8.87.

EXAMPLE 2

*2-propionyl-8-chloro-2,4-dihydro-6-phenyl[1,2,3,5]thiatriazolo[5,4-a][1,4]benzodiazepine-1 oxide*

In the manner given in Example 1, 2-(2-propionylhydrazino)-7-chloro-5-phenyl-3H-1,4-benzodiazepine can be reacted with thionyl chloride in the presence of pyridine to give 2-propionyl - 8 - chloro - 2,4 - dihydro-6-phenyl [1,2,3,5]thiatriazolo[5,4-a][1,4]benzodiazepine 1-oxide.

EXAMPLE 3

*2 - propionyl - 8 - chloro - 2,4 - dihydro - 6 - (2,6 - difluorophenyl)[1,2,3,5]thiatriazolo[5,4 - a][1,4]benzodiazepine-1-oxide*

In the manner given in Example 1, 2 - (2 - propionylhydrazino) - 7 - chloro - 5 - (2,6-difluorophenyl)-3H-1,4-benzodiazepine can be reacted with thionyl chloride in the presence of pyridine to give 2-propionyl-8-chloro-2,4-dihydro - 6 - (2,6-difluorophenyl)[1,2,3,5]thiatriazolo[5,4-a][1,4]benzodiazepine-1-oxide.

EXAMPLE 4

*2-acetyl-8-chloro-2,4-dihydro-6-(o-chlorophenyl)1,2,3,5]thiatriazolo[5,4-a][1,4]benzodiapepine-1-oxide*

In the manner given in Example 1, 2-(2-acetylhydrazino)-7-chloro - 5 - (o-chlorophenyl)-3H-1,4-benzodiazepine can be reacted with thionyl chloride in the presence of pyridine to give 2-acetyl - 8 - chloro-2,4-dihydro-6-(o-chlorophenyl)[1,2,3,5]thiatriazolo[5,4 - a][1,4]benzodiazepine 1-oxide of melting point 162–165° C.

EXAMPLE 5

*2-acetyl-8-nitro-2,4-dihydro-6-(o-chlorophenyl)[1,2,3,5]thiatriazolo[5,4-a][1,4]benzodiazepine-1-oxide*

In the manner given in Example 1, 2-(2-acetylhydrazino)-7-nitro-5-(o-chlorophenyl)-3H-1,4 - benzodiazepine can be reacted with thionyl chloride in the presence of pyridine to give 2-acetyl-8-nitro-2,4-dihydro-6-(o-chlorophenyl)[1,2,3,5]thiatriazolo[5,4 - a][1,4]benzodiazepine 1-oxide.

EXAMPLE 6

*2 - acetyl-10-trifluoromethyl-2,4-dihydro-6-(m-nitrophenyl)[1,2,3,5]thiatriazolo[5,4 - a][1,4]benzodiazepine-1-oxide*

In the manner given in Example 1, 2-(2-acetylhydrazino)-9-trifluoromethyl-5-(m-nitrophenyl) - 3H-1,4-benzodiazepine can be reacted with thionyl chloride in the presence of pyridine to give 2-acetyl-10-trifluoromethyl-2,4-dihydro - 6 - (m - nitrophenyl)[1,2,3,5]thiatriazolo[5,4-a][1,4]benzodiazepine-1-oxide.

EXAMPLE 7

*2 - propionyl - 4,8,9 - triethyl-2,4-dihydro-6-(o-cyanophenyl)[1,2,3,5]thiatriazolo[5,4 - a][1,4]benzodiazepine-1-oxide*

In the manner given in Example 1, 2-(2-propionylhydrazino) - 3,7,8 - triethyl - 5 - (o-cyanophenyl)-3H-1,4-benzodiazepine can be reacted with thionyl chloride in the presence of pyridine to give 2-propionyl-4,8,9-triethyl-2,4-dihydro - 6 - (o - cyanophenyl)[1,2,3,5]thiatriazolo[5,4-a][1,4]benzodiazepine-1-oxide.

EXAMPLE 8

*2 - propionyl - 8 - iodo-2,4-dihydro-6-(p-methylsulfonylphenyl)[1,2,3,5]thiatriazolo[5,4-a][1,4]benzodiazepine-1-oxide*

In the manner given in Example 1, 2-(2-propionylhydrazino)-7-iodo-5-(p - methylsulfonylphenyl) - 3H - 1,4-benzodiazepine can be reacted with thionyl chloride in the presence of pyridine to give 2-propionyl-8-iodo-2,4-dihydro-6-(p - methylsulfonylphenyl)[1,2,3,5]thiatriazolo[5,4-a][1,4]benzodiazepine-1-oxide.

EXAMPLE 9

*2-propionyl-9-acetamido-2,4-dihydro-6-phenyl[1,2,3,5]thiatriazolo[5,4-a][1,4]benzodiazepine-1-oxide*

In the manner given in Example 1, 2-(2-propionylhydrazino)-8-acetamido-5-phenyl-3H-1,4 - benzodiazepine can be reacted with thionyl chloride in the presence of pyridine to give 2-propionyl-9-acetamido-2,4-dihydro-6-phenyl[1,2,3,5]thiatriazolo[5,4 - a][1,4]benzodiazepine-1-oxide.

EXAMPLE 10

*2-propionyl-4-isopropyl-8,9-dicyano-2,4-dihydro-6-phenyl-[1,2,3,5]thiatriazolo[5,4-a][1,4]benzodiazepine-1-oxide*

In the manner illustrated by the beforegoing examples hydrazino)-3-isopropyl-7,8-dicyano-5 - phenyl - 3H - 1,4-benzodiazepine can be reacted with thionyl chloride in the presence of pyridine to give 2-propionyl-4-isopropyl-8,9-dicyano-2,4-dihydro - 6 - phenyl[1,2,3,5]thiatriazolo-[5,4-a][1,4]benzodiazepine-1-oxide.

In the manner illustrated by the beforegoing Examples other 2-acyl-2,4-dihydro - 6 - phenyl[1,2,3,5]thiatriazolo-[5,4-a][1,4]benzodiazepine-1-oxides (II) can be prepared by reacting a selected 2-(2-acylhydrazino)-5-phenyl - 3H-1,4-benzodiazepine with thionyl chloride and an organic base. Representative compounds II, thus obtained, include:

2-acyel-9-methylthio-2,4-dihydro-6-(p-bromophenyl)-[1,2,3,5]thiatriazolo[5,4-a][1,4]benzodiazepine-1-oxide;
2-acetyl-7,9-difluoro-6-(m-propylsulfinylphenyl)[1,2,3,5]thiatriazolo[5,4-a][1,4]benzodiazepine-1-oxide;
2-acetyl-8,10-dicyano-6-phenyl[1,2,3,5]thiatriazolo-[5,4-a][1,4]benzodiazepine-1-oxide;
2-acetyl-9-ethylsulfonyl-6-(o-fluorophenyl)[1,2,3,5]thiatriazolo[5,4-a][1,4]benzodiazepine-1-oxide;
2-acetyl-8-dimethylamino-6-(m-iodophenyl)[1,2,3,5]thiatriazolo[5,4-a][1,4]benzodiazepine-1-oxide;
2-acetyl-6-(o-chlorophenyl)[1,2,3,5]thiatriazolo[5,4-a]-[1,4]benzodiazepine-1-oxide;

2-propionyl-10-formamido-6-(o-fluorophenyl)[1,2,3,5]thiatriazolo[5,4-a][1,4]benzodiazepine-1-oxide;

2-propionyl-7-bromo-6-(o-ethylthiophenyl)[1,2,3,5]thiatriazolo[5,4-a][1,4]benzodiazepine-1-oxide;

2-propionyl-9-acetamido-6-phenyl[1,2,3,5]thiatriazolo[5,4-a][1,4]benzodiazepine-1-oxide;

2-propionyl-4-methyl-8-chloro-6-phenyl[1,2,3,5]thiatriazolo[5,4-a][1,4]benzodiazepin-1-oxide;

2-propionyl-4-propyl-9-nitro-6-(p-ethylphenyl)[1,2,3,5]thiatriazolo[5,4-a][1,4]benzodiazepine-1-oxide;

2-propionyl-4-isopropyl-8,9-dicyano-6-phenyl[1,2,3,5]thiatriazolo[5,4-a][1,4]benzodiazepine-1-oxide;

and the like.

The compounds of Formula II of the foregoing examples and lists are converted to acid addition salts by reaction with stoichiometrically calculated amounts of selected acids, in water, ethanol, or, with the hydrogen halides in particular, in ether. In this manner the hydrochlorides, hydrobromides, hydriodides, sulfates, phosphates, acetates, propionates, lactates, tartrates, citrates, maleates, pamoates, benzenesulfonates, p-toluenesulfonates, methanesulfonates, cyclohexanesulfamates, salicylates and the like of the foregoing 2-acyl-2,4-dihydro-6-phenyl[1,2,3,5]thiatriazolo[5,4 - a][1,4]benzodiazepine-1-oxides are obtained.

I claim:

1. A compound selected from the group consisting of 2-acyl-2,4-dihydro-6-phenyl[1,2,3,5]thiatriazolo[5,4 - a]-[1,4]benzodiazepine-1-oxide of the formula:

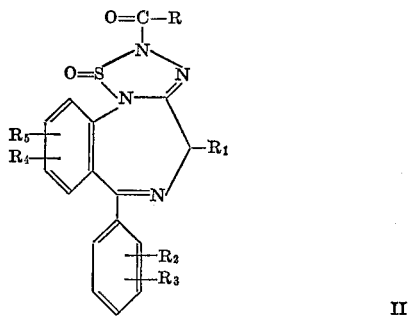

II wherein R is hydrogen or alkyl of 1 to 2 carbon atoms, inclusive; wherein $R_1$ is hydrogen or alkyl of 1 to 3 carbon atoms, inclusive; and wherein $R_2$, $R_3$, $R_4$, and $R_5$ are selected from the group consisting of hydrogen, alkyl of 1 to 3 carbon atoms, inclusive, fluoro, chloro, bromo, iodo, nitro, cyano, trifluoromethyl, and alkoxy, alkylthio, alkylsulfonyl, alkylsulfinyl, amino, alkanoylamino in which the carbon moiety is of 1 to 3 carbon atoms and dialkylamino in which alkyl is of 1 to 3 carbon atoms, inclusive; and the pharmacologically acceptable acid addition salts thereof.

2. A compound according to claim 1 wherein R is methyl.

3. The compound of claim 2 wherein R is methyl, $R_1$, $R_2$, $R_3$, and $R_5$ are hydrogen, $R_4$ is 8-chloro, and the compound is therefore 2-acetyl-8-chloro-2,4-dihydro-6 - phenyl[1,2,3,5]thiatriazolo[5,4 - a][1,4]benzodiazepine-1-oxide.

4. A compound according to claim 2, wherein R is methyl, $R_1$, $R_3$, and $R_5$ are hydrogen, $R_2$ is o-chloro, $R_4$ is 8-chloro, and the compound is therefore 2-acetyl-8-chloro-2,4-dihydro-6 - (o - chlorophenyl)[1,2,3,5]thiatriazolo[5,4-a][1,4]benzodiazepine-1-oxide.

5. A process for the production of a 2-acyl-2,4-dihydro-6 - phenyl[1,2,3,5]thiatriazolo[5,4 - a][1,4]benzodiazepine 1-oxide of the Formula II

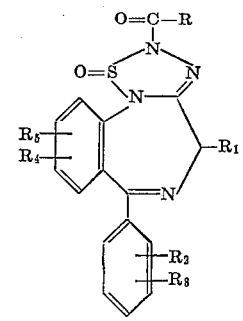

II wherein R is hydrogen or alkyl of 1 to 2 carbon atoms, inclusive; wherein $R_1$ is hydrogen or alkyl of 1 to 3 carbon atoms, inclusive; and wherein $R_2$, $R_3$, $R_4$, and $R_5$ are selected from the group consisting of hydrogen, alkyl of 1 to 3 carbon atoms, inclusive, fluoro, chloro, bromo, iodo, nitro cyano, trifluoromethyl, and alkoxy, alkylthio, alkylsulfonyl, alkylsulfinyl, amino, alkanoylamino in which the carbon moiety is of 1 to 3 carbon atoms and dialkylamino in which alkyl is of 1 to 3 carbon atoms, inclusive, which comprises: reacting a benzodiazepin-2-yl hydrazide of Formula I

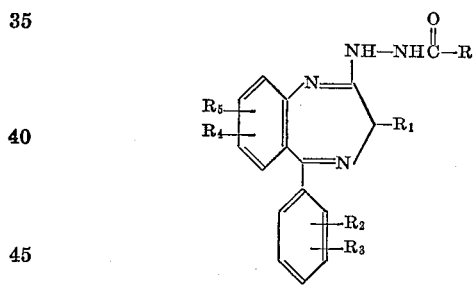

wherein R, $R_1$, $R_2$, $R_3$, $R_4$, and $R_5$ are defined as above, with thionyl chloride at temperatures between −20 and 10° C. and heating the reaction mixture up to 40° C., in the presence of an organic base.

6. The process of claim 5 wherein the organic base is pyridine.

References Cited

Reimlinger et al.: Chem. Ber., vol. 103, pp. 1934–1941 (1970).

ALTON D. ROLLINS, Primary Examiner

U.S. Cl. X.R.

71—91; 260—239 BD, 239.3 D; 424—270